United States Patent [19]
Parkin

[11] Patent Number: 4,518,141
[45] Date of Patent: May 21, 1985

[54] CEILING MOUNTING ASSEMBLY

[76] Inventor: Robert L. Parkin, 9 Old Field Rd., Huntington, L.I., N.Y. 11743

[21] Appl. No.: 426,715

[22] Filed: Sep. 29, 1982

[51] Int. Cl.³ .............................................. F16M 13/00
[52] U.S. Cl. .................................... 248/546; 248/57; 248/217.2; 248/DIG. 6
[58] Field of Search ............... 248/27.1, 57, 71, 217.2, 248/546, DIG. 6; 411/119, 123

[56] References Cited

U.S. PATENT DOCUMENTS

| | | | |
|---|---|---|---|
| 150,230 | 4/1874 | Dobbs et al. | 248/217.2 X |
| 1,168,860 | 1/1916 | Corotto | 411/119 X |
| 1,552,204 | 9/1925 | Bowers | 248/DIG. 6 |
| 1,789,124 | 1/1931 | Wever | 248/DIG. 6 |
| 2,140,861 | 12/1938 | Stekette | 248/27.1 X |
| 2,246,189 | 6/1941 | Rugg et al. | 248/DIG. 6 |
| 2,370,944 | 3/1945 | Emerson | 411/119 |
| 2,380,793 | 7/1945 | Rugg | 248/DIG. 6 |
| 2,708,540 | 5/1955 | Cook et al. | 248/225.3 A |
| 2,713,983 | 7/1955 | Kay | 248/546 |

Primary Examiner—William H. Schultz
Attorney, Agent, or Firm—Nims, Howes, Collison & Isner

[57] ABSTRACT

Improved mounting fixture for ceiling mounted electric fans and like objects including a pair of opposingly displaceable joist-engagement blocks mounted on the ends of a threaded support member.

2 Claims, 3 Drawing Figures

CEILING MOUNTING ASSEMBLY

This invention relates to the suspension of articles from existing ceiling structures and particularly to a mounting assembly for suspending light fixtures, ceiling fans and like objects through existing residential ceiling structures.

The refurbishment and self improvement of residential housing and particularly the mounting of chandeliers, light fixtures, ceiling fans and other relatively heavy articles presents serious problems to the average home owner, both as to basic structure modification and as to the expense incident thereto. When mounting such objects, as for example a ceiling fan, through an existing ceiling surface where no attic or crawl space is present thereabove, access to the overlying ceiling support joist structure is normally limited by the size of an existing or newly made aperture in the ceiling, which such aperture must be consistent in size with the escutcheon of the device being mounted, in order to retain a finished ceiling appearance and to avoid major ceiling reconstruction. The desired small size of such aperture and attendant limited accessibility to the overlying joist structure therethrough, in turn, limits both the size of the mounting hardware and the ability of the installer to apply meaningfully heavy forces to effect the installation thereof. As a consequence, existing ceiling mounting hardware has restricted the size, weight rigidity and to some extent, safety of such hung devices.

This invention may be briefly described as an improved mounting fixture for ceiling mounted electric fans, chandeliers and similar objects and which, in its broad aspects, includes a pair of opposingly displaceable joist engagement blocks threadedly mounted on the ends of a single support member having a non-threaded center portion together with a hanger bracket slideably positionable thereon.

Among the advantages of the subject invention is the provision of a simple and inexpensive mounting fixture for ceiling fans and like objects that is easily installed by a home owner or the like. Further advantages include the provision of a ceiling type mounting fixture that is capable of supporting substantial amounts of weight and which yet may be easily installed through a small sized aperture in a ceiling structure normally covered by a ceiling fixture escutcheon or the like. Still another advantage of the subject invention is the provision of a readily installable ceiling type mounting fixture that can accommodate the ceiling mounting of flush and suspended type lighting fixtures, ceiling fans and the like.

The primary object of this invention is the provision of an improved ceiling mounting assembly for light fixtures, ceiling fans and the like which can be installed through ceiling cutouts consistent with the size device being hung.

A further object of this invention is the provision of a ceiling mounting fixture which can be firmly and readily secured to the overlying ceiling support structure and which will support substantial amounts of weight.

Other objects and advantages of the subject invention will become apparent from the following portions of this specification and from the appended drawings which illustrate, in accord with the mandates of the patent statutes, a presently preferred embodiment of a ceiling mounting fixture incorporating the principles of this invention.

DESCRIPTION OF THE PREFERRED EMBODIMENT

Figure 1:
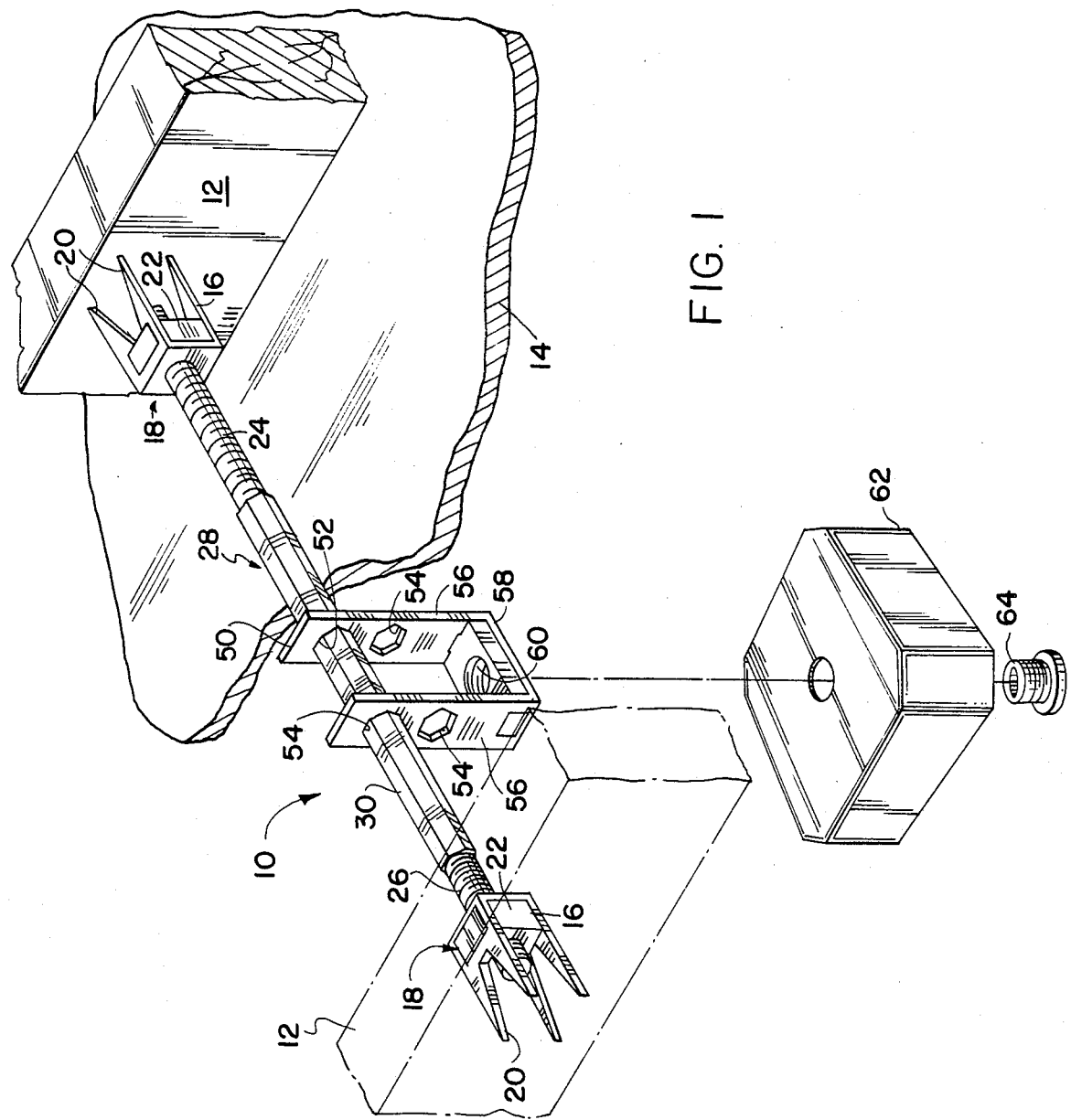
FIG. 1 is an oblique view of a ceiling mounting assembly incorporating the principles of this invention.

Referring to the drawings, a ceiling fixture mounting assembly, generally designated 10, is shown in operative association with a pair of joists 12 forming the overlying support structure for a ceiling 14. In most residential housing and in many commercial buildings, the joists 12 are conventially formed of wood and are capable of supporting considerable amounts of weight. In contradistinction thereto, the ceiling 14 is formed of lath base and plaster or is formed of "sheetrock" panels and is not a weight-bearing structure.

The illustrated ceiling mounting fixture 10 comprises a pair of opposed joist engagement blocks 16, each having a generally rectangular base section 18 and a plurality, suitably four, of outwardly extending lance points 20. The base section 18 of the joist engagement blocks 16 conveniently may include a nut 22 for threadedly mounting such blocks 16 on the oppositely threaded ends 24 and 26 of an elongate support member generally designated 28. The elongate support member 28 may be provided in various lengths sized to be accommodated intermediate rafters of predetermined spacing. If desired one of such available lengths can be markedly oversized to permit selective cutting of the threaded ends 24 and 26 by a user to accommodate the same to the exigencies of a particular installation. The elongate support member 28 includes an unthreaded center portion 30 conveniently of hexagonal cross-sectional configuration to permit engagement thereof by a conventionally sized wrench. As will now be apparent, rotation of the support member 28 is translated into axial movement of the joist engagement blocks 16. As noted above, the threaded ends 24 and 26 are oppositely threaded so that rotative displacement of the support member 28 in one direction will cause conjoint displacement of the joint engagement blocks 16 outwardly or away from the center portion 30 and rotative displacement in the reverse direction will cause conjoint displacement of the joist engagement blocks 16 inwardly or toward said center portion 30.

Figure 3:
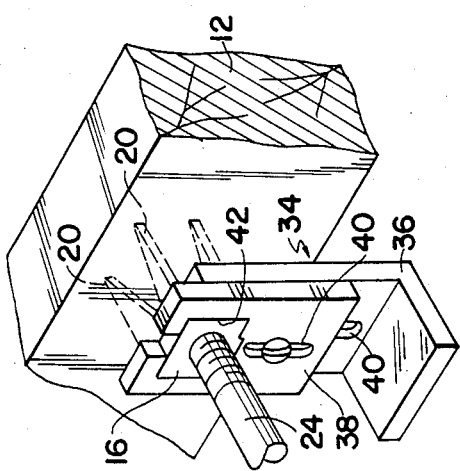
FIG. 3 is an oblique view of a stand-off or positioning bracket operatively associated with a joist-engagement block.

In order to assure the desired axial displacement of the joist-engagement blocks 16 in response to rotative displacement of the elongate support member 28, a stand-off member 34, desirably in the form of an adjustable L-shaped bracket, is attached to at least one of the joist-engagement blocks 16. Preferably, however, a stand-off member 34 is attached to each of the joist-engagement blocks 16 where they additionally function to assure parallelism of the support member 28 with the ceiling and to assure that the prongs on the joist-engagement blocks will enter the rafters parallel to the grain of the wood thereof. As best shown in FIG. 3, such stand-off member 34 comprises a generally L-shaped bracket member having an outwardly splayed base section 36 and a two piece upright or vertical section generally designated 38 that is height adjustable as by the slot and screw section generally designated 40. The upper end of the vertical section 38 is provided with an aperture 42 sized to perimetrically encompass the base section 18 of the joist-engaging bracket 16. As will be apparent, such stand-off members 34 perform the multiple functions of positioning the support member 28 at a desired level above and parallel to the ceiling surface; to precisely position such support member over the center of the ceiling aperture; to align the prongs with the wood grain of the rafter; to also prevent undesired rotation of the joist-engagement blocks 16 when the support arm 28 is rotated prior to the engagement of prongs 20 with the joists 12 during installation; and to permit ready extension of the prongs by rotation of the support bar, all of which can be done with one hand, through the access hole in the ceiling.

Figure 2:
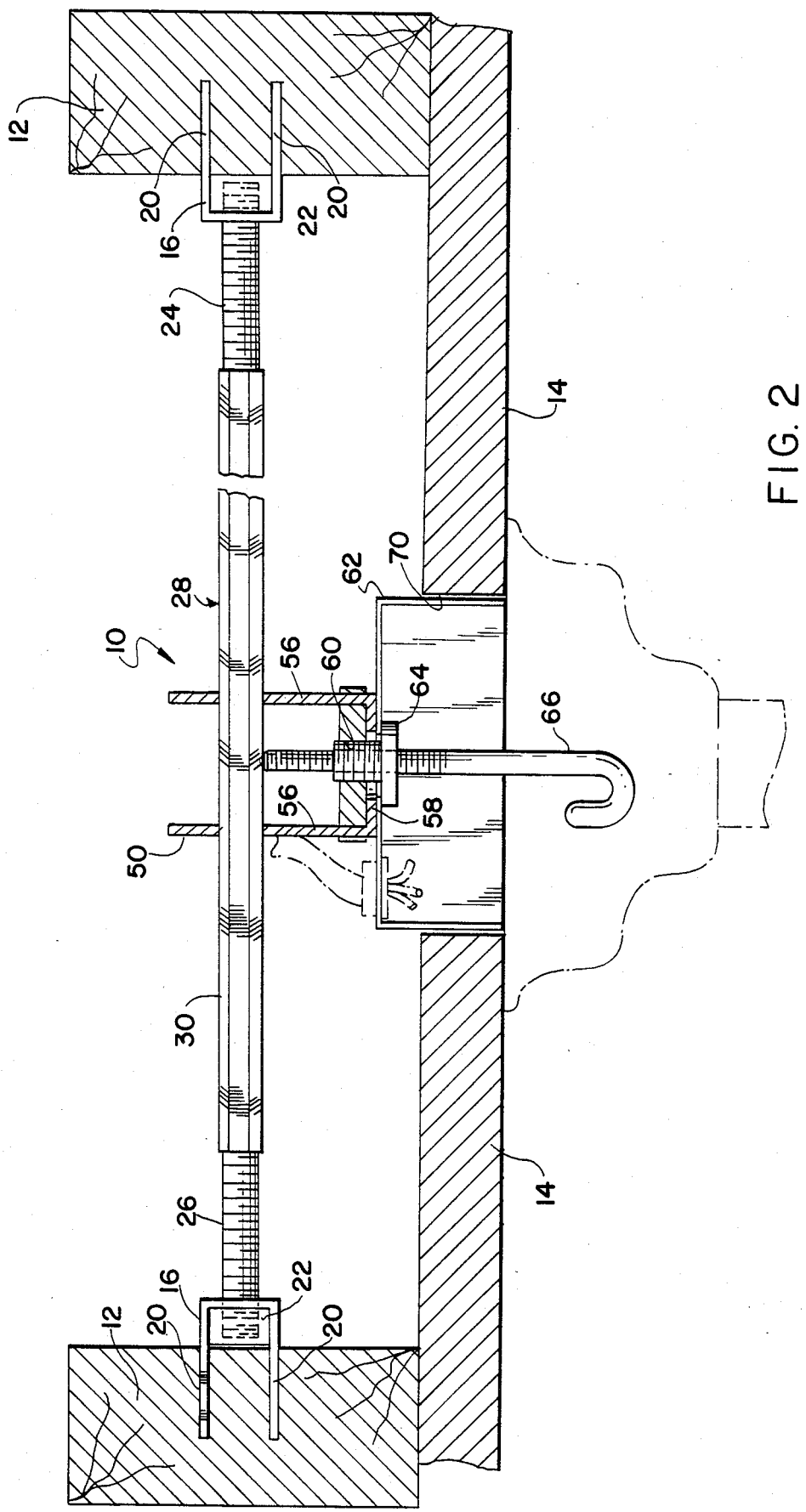
FIG. 2 is a side elevational, partly in section, view of the mounting assembly shown in FIG. 1.

As best shown in FIGS. 1 and 2, the improved mounting fixture 10 includes a generally U-shaped hanger bracket 50 having upper and lower aligned pairs of hexagonal apertures 52 and 54 in the spaced side walls 56 thereof to slideably accommodate the hexagonally shaped center section 30 of the support member 28. The base 58 of the U-shaped bracket 50 contains a threaded base 60 to permit mounting of a receptacle 62 by means of a threaded sleeve 64 which, in turn, provides, through various sizes of internal threads, a mounting means for the device to be suspended from the ceiling. As will be apparent, the upper and lower aperture parts 52 and 54 accommodate major height adjustment of the fixture relative to the ceiling 14.

In effecting the installation of the above described mounting bracket assembly, a suitable aperture 70, either newly formed or existing, of sufficient size to accommodate for example, a receptacle 62 is introduced into the ceiling 14. The U-shaped bracket 50 is appropriately mounted on the support member 28 with either the upper or lower set of apertures therein being disposed in slideable engagement with the hexagonal center section 30 of the support arm 28 in general accord with the desired height of the unit above the upper surface of the ceiling 14 and such is initially positioned out of engagement with the hexagonal center section 30 as by displacement therealong and into loose engagement with one of the threaded end sections. The joist-engaging blocks 16 are then rotated into a retracted position in which the spacing between the terminal ends of the extending prongs 20 thereof is adjusted to be slightly less than that of the spacing of the joists 12.

Fine adjustment of the ultimate installed height, in order to properly locate the bottom of the receptacle 62 even with or slightly above the bottom surface of the ceiling 14, can readily be effected by preadjustment of the length of the stand-off members 34 mountable on the joist or rafter engaging blocks 16.

Following such preliminary adjustments, the mounting fixture, less the receptacle 62 and mounting sleeve 64, is manually inserted through the aperture 70 and appropriately positioned transverse to the joists 12 with the prongs 20 on one of the joist-engaging blocks 16 being manually pressed into one of the joists 12 at the appropriate height as determined by the preadjustment of the stand-off members. If properly spaced as outlined above, the joist-engaging block 16 at the other end of the support arm 28 will have the ends of its extending prongs 20 disposed close to, but just shy of, engagement with the other joist 12. The height of such unengaged block 16 will be accurately positioned by the preadjusted stand-off member 34, whose splayed base portion 36 will be resting upon the upper surface of the ceiling 14 to both properly position the height of the block 16 and to preclude rotation thereof.

With the components of the fixture so positioned relative to the joists 12, initial rotation of the hexagonal center section 30 in the appropriate direction, which may readily be effected by an open end wrench through the aperture 70, will result, because of the manual pre-engagement of the prongs on one of the blocks 16 with a joist 12, in an initial selective axial displacement of the other and unengaged joist-engaging block 16 until the initial ends of prongs 20 thereon engage the other joist 12. Such engagement precludes any possibility of rotative displacement thereof. At this time and with both of the joist-engaging blocks having their extending prongs 20 embedded in the joists 12, further rotative displacement of the center section 30 of the support bar 28 will result in conjoint outward lineal displacement of the joist-engaging blocks 16 and concomitant further penetration of the prongs 20 into the joists 12. As will be apparent, the mechanical advantage attendant the described screw-type displacement means permits the prongs 20 to be deeply embedded in the joists 12 without the application of undue degrees of rotative force to the support bar 28. As will also be apparent, the described penetration of the prongs 20 in the joists 12 provides not only a rigid support system but one which is capable of bearing considerable weight.

With the support bar 28 so positioned through prong penetration of the joists, the U-shaped hanger bracket 50 is then longitudinally displaced from the threaded end portion 24 and remounted on the hexagonal center section 30 and appropriately positioned thereon so as to be centered within the ceiling opening 70. A receptacle 62 is then conveniently mounted thereon by use of the threaded sleeve 64. As previously noted the threaded sleeve can have different sized internal threads to accommodate various types of fixtures and fan hanging devices. For example a "J" type hook 66 may be employed for fans and an elongate threaded rod, not shown, may be employed for fixtures. With either of such type of hanging device, final lock-up is accomplished by threading the hook 66 or rod through the sleeve 64 until the terminal end thereof contacts the support bar 28. Such engagement provides an exceptionally rigid mounting that is effectively vibration free and which also prevents undesired displacement of the hanger bracket 50 along the support member 28.

Having thus described my invention, I claim:

1. A ceiling fixture mounting assembly insertable through a ceiling opening disposed intermediate a pair of overlying ceiling joists comprising, an elongate support member sizeable to be accommodated between said joists and having a pair of oppositely threaded end portions extending outwardly from an unthreaded planar surfaced midportion;

a joist-engaging block member threadedly mounted on each of said extending end portions of said support member adapted for individual axial displacement thereon in response to induced rotative displacement of said midportion of said support member relative thereto;

prong means extending outwardly from each of said joist-engaging block members for penetrational embedment in said joists in response to outwardly directed axial displacement of said block members;

fixture hanger means slideably positionable along said support member for selective location relative to said ceiling opening;

means associated with at least one of said joist-engaging blocks for preventing rotative displacement thereof in response to rotative displacement of said elongate support member prior to prong means embedment in said ceiling joists;

said last mentioned means being adjustable in length and serving to locate the locus of prong embedment in said joist.

2. A ceiling fixture mounting assembly insertable through a ceiling opening disposed intermediate a pair of overlying ceiling joists comprising, an elongate support member sizeable to be accommodated between said joists and having a pair of oppositely threaded end portions extending outwardly from an unthreaded planar surfaced midportion;

a joist-engaging block member threadedly mounted on each of said extending end portions of said support member adapted for individual axial displacement thereon in response to induced rotative displacement of said midportion of said support member relative thereto;

prong means extending outwardly from each of said joist-engaging block members for penetrational embedment in said joists in response to outwardly directed axial displacement of said block members;

fixture hanger means slideably positionable along said support member for selective location relative to said ceiling opening;

means associated with each of said joist-engaging blocks for preventing rotative displacement thereof in response to rotative displacement of said elongate support member prior to prong means embedment in said ceiling joists;

each of said last mentioned means being adjustable in length and serving to both locate the locus of prong embedment in said joist and to position said elongate support member in spaced relation to said ceiling opening.

* * * * *